(12) United States Patent
Rosengren et al.

(10) Patent No.: US 10,626,980 B2
(45) Date of Patent: Apr. 21, 2020

(54) LINEAR ACTUATOR SYSTEM

(71) Applicant: Tolomatic, Inc., Hamel, MN (US)

(72) Inventors: Gary W. Rosengren, Brooklyn Park, MN (US); Wyatt Grunerud, Minnetonka, MN (US); Jeremy Forbord, Mound, MN (US); Aaron Dietrich, Rogers, MN (US)

(73) Assignee: Tolomatic, Inc., Hamel, MN (US)

( * ) Notice: Subject to any disclaimer, the term of this patent is extended or adjusted under 35 U.S.C. 154(b) by 0 days.

(21) Appl. No.: 15/588,142

(22) Filed: May 5, 2017

(65) Prior Publication Data

US 2017/0321795 A1    Nov. 9, 2017

Related U.S. Application Data

(60) Provisional application No. 62/332,647, filed on May 6, 2016.

(51) Int. Cl.
*F16H 57/04* (2010.01)
*H02K 9/19* (2006.01)
(Continued)

(52) U.S. Cl.
CPC ......... *F16H 57/0497* (2013.01); *F16H 25/20* (2013.01); *F16H 57/0476* (2013.01); *H02K 5/1735* (2013.01); *H02K 7/06* (2013.01); *H02K 9/19* (2013.01); *H02K 9/22* (2013.01); *F16H 2025/2031* (2013.01); *F16H 2025/2075* (2013.01); *H02K 5/20* (2013.01); *H02K 2213/12* (2013.01)

(58) Field of Classification Search
CPC ......... F16H 57/0497; F16H 2025/2031; F16H 57/0476; F16H 57/04; F16H 25/20; H02K 2213/12; H02K 9/19
USPC .................................................. 310/12.31, 90
See application file for complete search history.

(56) References Cited

U.S. PATENT DOCUMENTS 3,127,530 A * 3/1964 White .................. F04B 53/08
                                                            165/46
3,991,572 A  11/1976 Huebscher et al.
(Continued)

FOREIGN PATENT DOCUMENTS

DE      2821726 A1 * 11/1979 ......... F16H 57/0497
DE     60033379 T2   10/2007
EP      1414135 A2    4/2004

OTHER PUBLICATIONS

Notification dated Jul. 26, 2017 in connection with International Patent Application PCT/US2017/031318, 19 pages.
(Continued)

*Primary Examiner* — Jake Cook
*Assistant Examiner* — Randell J Krug
(74) *Attorney, Agent, or Firm* — Dorsey & Whitney LLP

(57) ABSTRACT

An actuator system includes a housing with a screw shaft extending along a longitudinal axis. The stator component of an electric motor is coupled to the housing, with a rotor extending along the longitudinal axis. A thrust tube is engaged with the screw shaft, for example with a nut assembly configured to convert rotational motion of the rotor into linear motion of the thrust tube. A modular cooling assembly is selectively coupled to the exterior surface of the actuator housing, and configured to dissipate heat.

35 Claims, 8 Drawing Sheets

(51) Int. Cl.
    *H02K 7/06* (2006.01)
    *H02K 9/22* (2006.01)
    *H02K 5/173* (2006.01)
    *F16H 25/20* (2006.01)
    *H02K 5/20* (2006.01)

(56) References Cited

U.S. PATENT DOCUMENTS

| | | | | |
|---|---|---|---|---|
| 5,069,076 A | * | 12/1991 | Rosenthal | F16H 57/04 |
| | | | | 74/89.44 |
| 5,099,161 A | | 3/1992 | Wolfbauer, III | |
| 5,998,889 A | | 12/1999 | Novak | |
| 7,105,959 B2 | * | 9/2006 | Yamamoto | H02K 5/20 |
| | | | | 310/52 |
| 7,137,489 B2 | | 11/2006 | Bastholm et al. | |
| 7,755,315 B2 | | 7/2010 | Bott et al. | |
| 7,939,979 B2 | * | 5/2011 | Hochhalter | H02K 11/21 |
| | | | | 310/80 |
| 8,026,640 B2 | | 9/2011 | Bott et al. | |
| 9,748,821 B2 | * | 8/2017 | Carpentier | H02K 9/19 |
| 2002/0135248 A1 | | 9/2002 | Coyac et al. | |
| 2004/0080220 A1 | | 4/2004 | Yamamoto et al. | |
| 2005/0253469 A1 | | 11/2005 | Hochhalter et al. | |
| 2007/0057579 A1 | | 3/2007 | Miyamoto | |
| 2008/0149303 A1 | | 6/2008 | Chang et al. | |
| 2009/0039713 A1 | | 2/2009 | Bott et al. | |
| 2013/0320794 A1 | * | 12/2013 | Stiesdal | H02K 1/2786 |
| | | | | 310/90 |
| 2015/0115848 A1 | | 4/2015 | McFadden | |

OTHER PUBLICATIONS

International Search Report and Written Opinion dated Sep. 22, 2017 in connection with International Patent Application No. PCT/US2017/031318.

Office Action dated Nov. 30, 2018 in connection with Chinese Patent Application No. 2017103125553, 21 pages including English translation.

Second Office Action issued in Chinese Patent Application No. 2017103125553, dated Sep. 12, 2019, 15 pages including 4 pages of English translation.

* cited by examiner

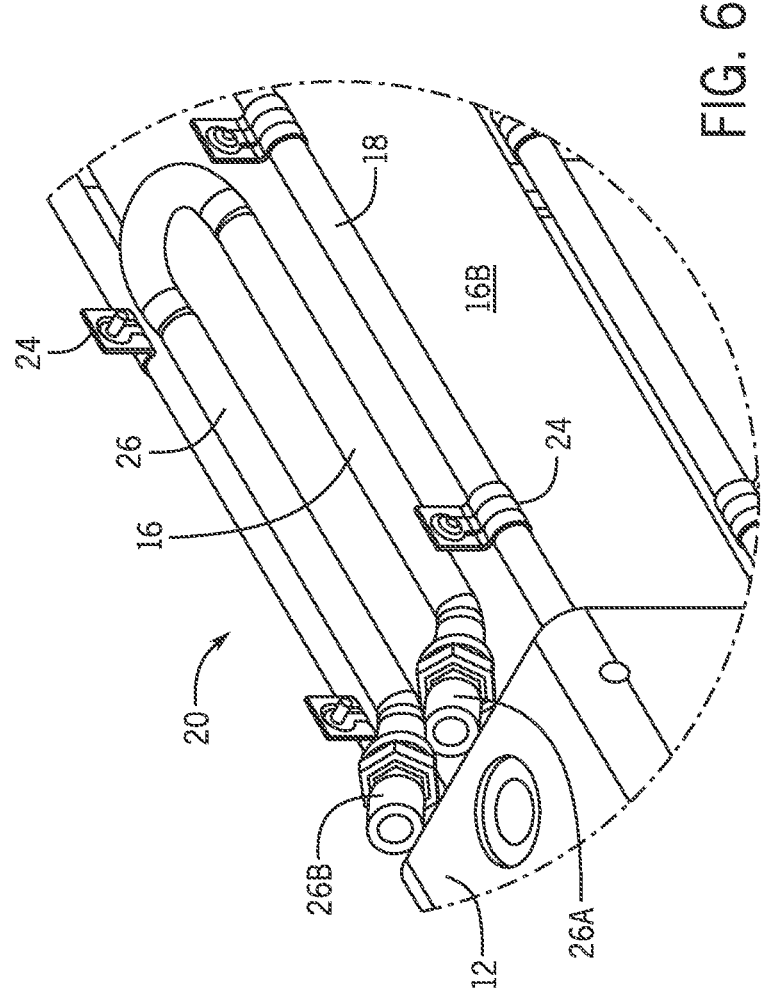

LINEAR ACTUATOR SYSTEM

CROSS-REFERENCE TO RELATED APPLICATION

This application claims priority to U.S. Provisional Application No. 62/332,647, LINEAR ACTUATOR WITH MODULAR WATER COOLING, filed May 6, 2016, which is incorporated by reference herein, in the entirety and for all purposes.

BACKGROUND

This disclosure relates generally to linear actuators, and more specifically to integrated motor actuators configured for modular cooling systems, including fluid-cooled devices and other active and passive cooling systems. Suitable applications include, but are not limited to, lightweight, water-cooled linear actuator systems for use in resistance spot welding, and other actively and passively cooled actuator devices configured for automated machine tasks.

Linear actuators are used to control movement and positioning of automated fixtures across a broad range of industrial processes, including automobile assembly, electronics fabrication, machine tooling, materials handling, and in the aerospace, defense, manufacturing and transportation sectors. Generally, rod-style actuators work by extending and retracting a thrust tube with a workpiece or tooling fixture attached to the free end, in order to manipulate industrial components or to perform manufacturing tasks such as welding and machining. Rodless (carriage or rail-based) positioning systems are also common, and variety of different hydraulic, pneumatic and electric motor drives systems are available depending on desired speed, loading and other operational characteristics.

Integrated motor electric actuators are available with a motor and actuator assembly provided in a single housing structure, for example with the motor driving a screw shaft configured to position a thrust tube assembly with a workpiece connection on the free (external) end. Workpiece fixtures and other rod end connections can be configured to support a variety of different applications, for example a welding gun or other machine tool component.

The screw shaft typically engages a nut coupled with the thrust tube, converting rotary motion of the motor into linear motion of the thrust tube. Alternatively, a drive belt or gearing system can also be used. The motor can either be offset from the screw shaft and coupled via a gear or belt system, or mounted coaxially via a bearing journal assembly. In hollow rotor designs, the stator component can be fixed to the actuator housing with the rotor disposed coaxially about the screw shaft, or extending along a common rotational axis.

Linear actuator design is a complex task, subject to competing requirements for speed, cost, efficiency and service lifetime. Size and weight are also considerations in automated manufacturing applications, where the actuator system is commonly manipulated by an industrial robot arm or similar apparatus. Heating concerns are also relevant, particularly in high-speed, high repetition-rate applications, and where heat must be continuously dissipated from the motor drive and other actuator system components.

SUMMARY

This application is directed to a lightweight, integrated motor linear actuator configured for modular cooling. Suitable applications include water-cooled and other fluid-cooled actuator systems, passively cooled actuators, and modular cooling systems with a combination of active and passive cooling components.

Depending on application, the linear actuator system can include a housing having exterior and interior surfaces, with a screw shaft extending along a longitudinal axis inside the housing. An electric motor or drive system is sometimes provided with a stator component coupled to the interior of the housing, and a rotor component disposed coaxially about the screw shaft, extending along the longitudinal axis.

A thrust rod, thrust tube or similar component is typically engaged with the screw shaft via a nut assembly or similar coupling configured to convert rotational motion of the rotor (that is, about the longitudinal axis) into linear motion of the thrust component (along the axis). A cooling module can be selectively coupled to the exterior of the actuator housing, engaged in thermal contact and configured to dissipate heat generated by operation of the electric motor and other actuator system components.

BRIEF DESCRIPTION OF THE DRAWINGS

FIG. 6 is a detail view of a representative cooling module flow configuration for a linear actuator system.

DETAILED DESCRIPTION

Figure 1:
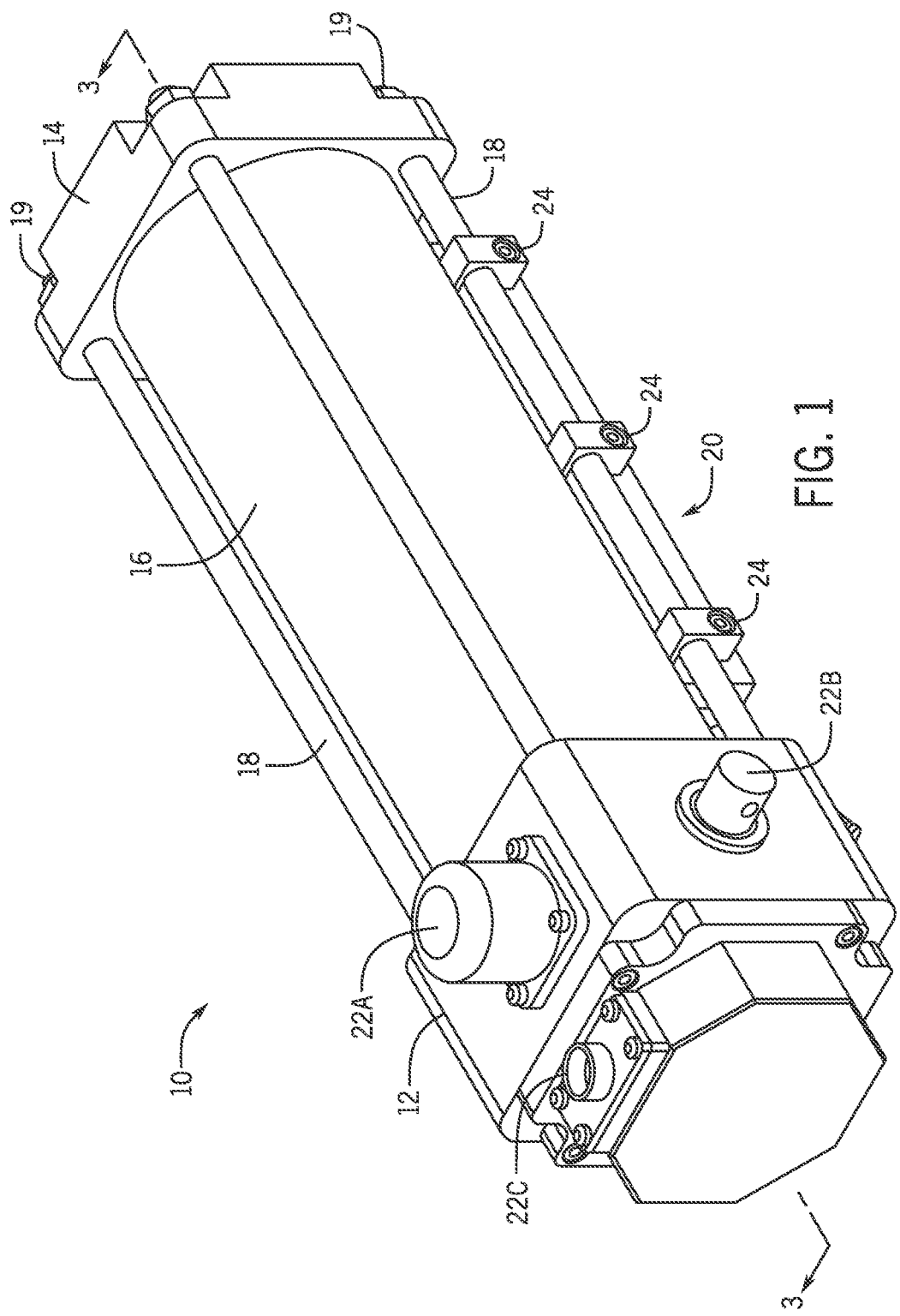
FIG. 1 is an isometric view of a lightweight, integrated motor linear actuator system configured for modular cooling.

Depending on application, suitable actuator systems can be provided in different standard sizes, e.g., with a common design theme encompassing a cylindrical body or central housing portion which also serves as the stator tube. This may be beneficial as the cost to manufacture can be relatively lower than for other designs, e.g., due to the cylindrical housing being commercially available in a variety of different tubing sizes, thicknesses and weights. In addition, the relatively thin wall of the housing can also be beneficial due to its structural integrity and light weight.

Weight can be an important design consideration in applications where the actuator device (and associated welding gun equipment or other machine tooling) is typically carried by a robot. Lighter system weight reduces loading on the robot arm, increasing speed and allowing for smaller robot systems with more precise positioning capability and higher rates.

The cylindrical body portion of the actuator housing can be held together between two end caps with tie rods or similar longitudinal fasteners. This reduces weight, as compared to thicker-walled designs, and improves the system's ability to cool the motor drive, which is a consideration in applications requiring the device to perform at high repetition rates (e.g., more welds per minute), or with greater travel in each movement. Higher rates and greater travel distances both mean additional mechanical work output; that is, the motor drive needs to work harder, and the system thus generates more heat.

To address these concerns, the actuator configurations described here have the ability to accept a modular water cooling assembly, or other active or passive modular cooling unit, which can be fastened to the tie rods along a selected side of the actuator housing. The addition of the cooling assembly adds to the motor capacity, for example up to two times, while maintaining acceptable system temperatures. The cooling assembly can also be added or removed independently at any time, simply by coupling or decoupling the assembly along selected side of the actuator housing, rather than being permanently installed at the point of manufacture.

Typical electric motor drives include an internal rotor, mounted in ball bearings on both ends. In some configurations described here, the entire rotor can be supported by a single bearing assembly at one end. In a cross sectional drawing (see FIG. 3 below), this can be described as a simply supported, short rotor assembly. Testing shows that this method can be sufficient to support the entire length of the rotor component in rotation about the longitudinal axis of the actuator, with suitable clearance between the rotor and stator along the rotor length.

Additional added benefits include further reducing weight due to eliminating additional bearing components as well as reducing mass and inertia of the rotor and drive system itself. Thus, the systems described here can encompass integrated motor actuators with a short rotor design, simply mounted with a single rotational bearing at one end, and an integrated motor actuator with one or more independent, separately mountable cooling assemblies or modules. Alternatively, additional bearings or similar rotational load components can also be provided; e.g., at the distal end of the rotor, or between the distal end of the rotor and the bearing assembly at the proximal end. The overall design of the system can also include a cylindrical stator body and housing assembly disposed between two end plates or cap blocks, coupled together with a set of tie rods or similar longitudinal fasteners.

FIG. 1 is an isometric view of a lightweight, integrated motor linear actuator system 10, configured for modular cooling. As shown in FIG. 1, a back end cap 12 and front cap 14 or similar housing structures are secured at opposite ends of a cylindrical or tubular housing body 16, using threaded tie rods or similar mechanical connectors 18. Connectors 18 extend longitudinally along the outer periphery of the main body or central housing structure 16, for example using nuts or similar mechanical attachments 19 to fasten rods 18 between corner locations on back end cap 12 and front cap 14, respectively.

A modular cooling unit (e.g., a cooling module or cooling assembly) 20 is provided in thermal contact with a selected outer surface or side of main housing body 16, and configured to dissipate heat generated by operation of actuator system 10. Various connections 22A, 22B and 22C can be provided for power, mounting, and feedback or control, and various encoder and control components can be provided inside housing 16. Alternatively, a separate motor control or positioning module can be provided.

In the particular example of FIG. 1, modular cooling assembly 20 is selectively coupled to the bottom of actuator system 10, between the lower pair of adjacent longitudinal rod connectors 18. A number of individual screw blocks, clips or other mechanical coupling members 24 are provided to mount cooling assembly 20 in the selected position between adjacent longitudinal rod connectors 18, in thermal contact with the bottom (outer) surface of the actuator housing 16.

Figure 2:
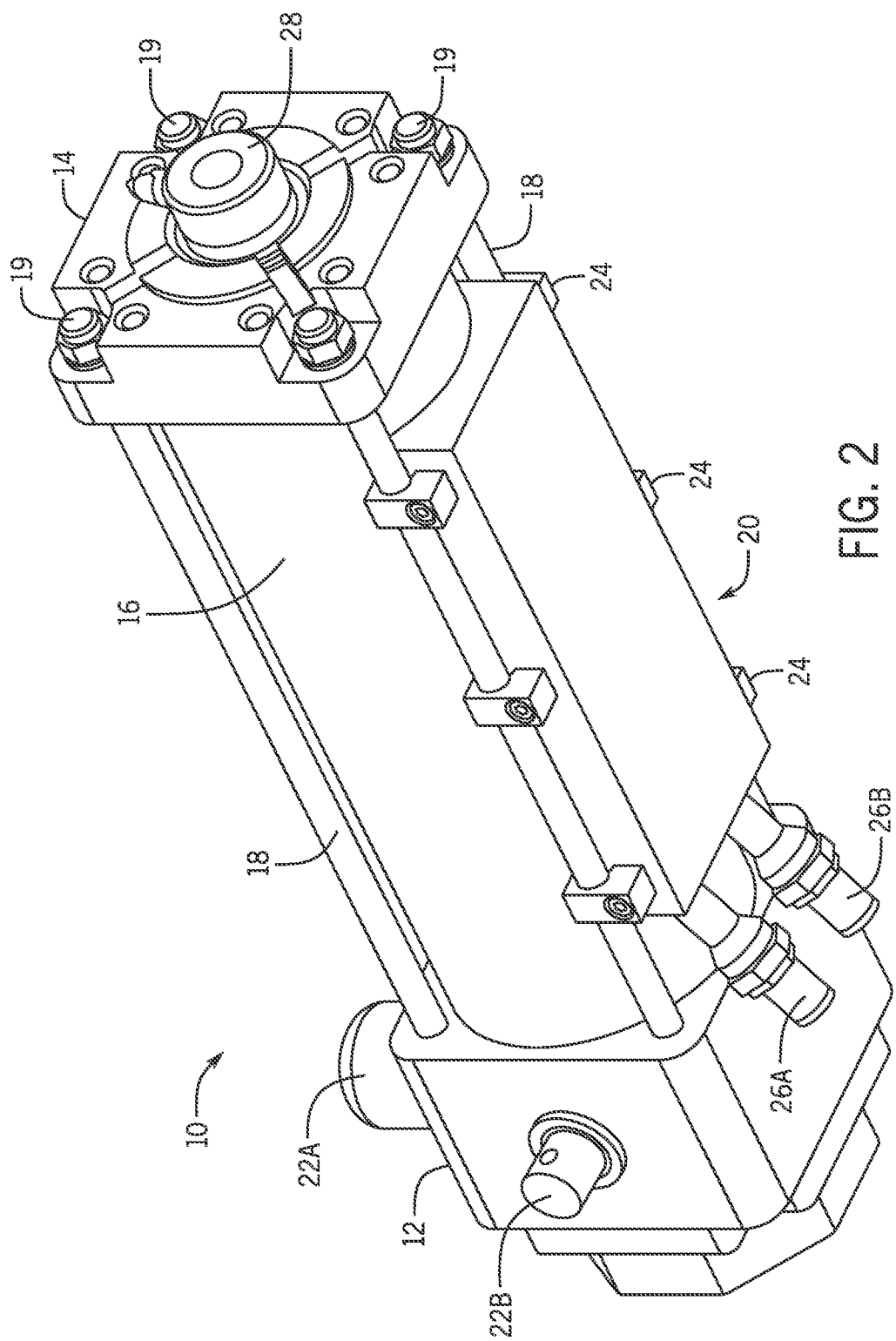
FIG. 2 is an alternate isometric view of the linear actuator system in FIG. 1, showing the cooling module.

FIG. 2 is a bottom isometric view of linear actuator system 10, showing a representative cooling assembly 20 with inlet and outlet couplings 26A and 26B for cooling fluid flow. The threaded rod end or workpiece fixture 28 is also visible, extending past the front 14 of the housing on the free end of the thrust tube or actuator rod. A lubrication port 29 can also be provided.

Although mounted to the bottom surface of actuator system 10 in FIGS. 1 and 2, cooling assembly 20 can also be mounted to the top or side of actuator housing 16, depending on desired location and available access. The flow through couplings 26A and 26B is then regulated to achieve a desired cooling capacity, based on the heating load on actuator system 10. Additional assemblies 20 can also be provided as needed or desired, depending on the heat generated under particular operational and environmental conditions.

The number and position of modular cooling assemblies 20 thus varies according to operational conditions and corresponding cooling requirements. The preferred locations may also depend upon accessibility consideration, including the location of other components such as the robot arm, welding gun, and other automated machine elements.

Figure 3:
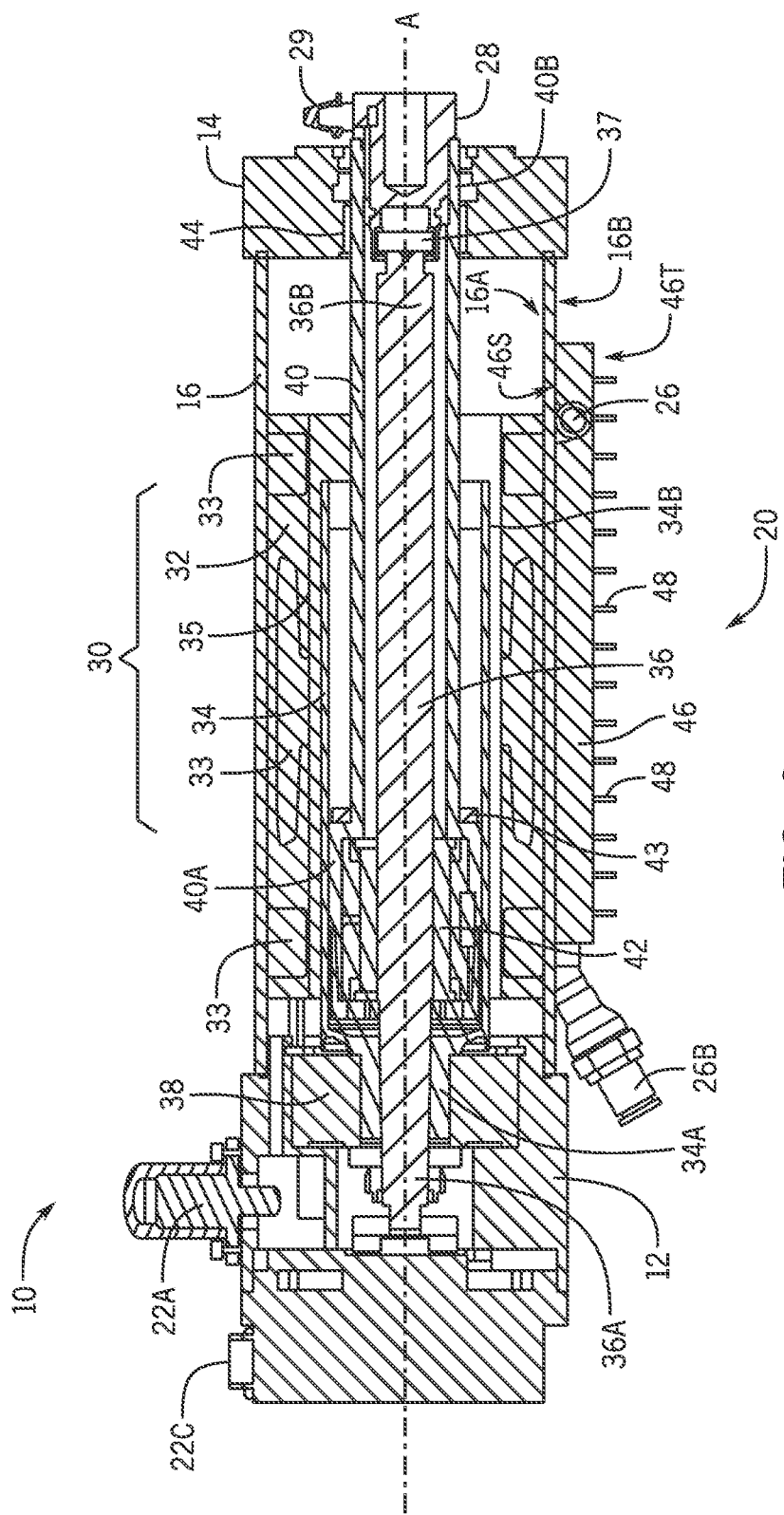
FIG. 3 is a longitudinal section view of the linear actuator system in FIGS. 1 and 2.

FIG. 3 is a longitudinal section view of an integrated motor linear actuator system 10 with a cooling assembly 20, taken along line F3-F3 in FIG. 1. Integrated motor drive 30 is provided within housing 16, and configured to drive thrust tube 40 in reciprocal motion along longitudinal axis A. Coupling fixture 28 is provided on the external end of thrust tube 40 (or a thrust rod or other thrust member), extending out past the front end 14 of the housing.

As shown in FIG. 3, housing 16 has internal (inner) and external (outer) surfaces 16A and 16B, respectively. Motor 30 includes stator 32, which is coupled to the inner surface 16A of housing 16, with stator windings 33 configured to generate a time-varying magnetic field. The field drives rotor 34 into rotation about longitudinal axis A via electromagnetic interaction with magnet elements 35. Power, mounting and feedback or control connections 22A, 22B and 22C can be provided to determine the rotational speed and direction, and to position actuator 10 and thrust tube 40 as desired. Additional control and positioning connections can also be provided, along with other accessory features such as an internal or external control module and a manual override for positioning thrust tube 40 when the motor is stuck or disengaged.

Actuator Configuration

Rotor 34 is coaxially disposed about screw shaft 36, extending along the longitudinal axis (or rotational axis) A within the main body of actuator housing 16. Proximal end 34A of rotor 34 is rotationally coupled to back end 36A of screw shaft 36, and supported by a ball bearing, roller bearing or similar rotational bearing assembly 38. Rotor 34 extends from proximal end 34A toward distal end 34B, opposite proximal end 34A along axis A.

As shown in FIG. 3, distal end 34B is a free end of rotor 34, unsupported by additional bearing components. Depending upon design, rotor 34 can thus be supported in rotation about axis A by a single bearing 38 at proximal end 34A, in a simply supported, short rotor assembly with no additional bearing components between the (single) bearing assembly 38 at proximal end 34A, and the free end of rotor 34 in distal portion 34B. Alternatively, additional bearings 38 or similar rotational load bearing components can be provided at distal end 34B of rotor 34, or between proximal end 34A and distal end 34B. The bearing configuration and placement may depend on design considerations including, but not limited to, rotor length, radial loading, and the desired clearance between rotor 34 and stator 32.

Screw shaft 36 extends along axis A from back end 36A to front end 36B of screw shaft 36, e.g., extending out past distal end 34B of rotor 34 to approximately the position of end cap 14. An elastic member or internal bumper 37 can be provided to reduce contact stresses when fixture 28 on distal end 40B of thrust tube 40 is fully retracted into end cap 14.

Thrust tube 40 is coaxially disposed about screw shaft 36, along rotational axis A of motor 30. Proximal end 40A of thrust tube 40 is coupled to screw shaft 36 via nut assembly 42, for example a ball nut or roller nut component engaging the externally threaded portion of screw shaft 36. Thrust tube 40 extends from the nut or coupling component 42 at proximal end 40A, out to the rod end or fixture 28 on distal end 40B. Thrust tube is driven into reciprocal motion by rotation of rotor 34 and screw shaft 36, with fixture 28 positioned outside front 14 of the housing as described above.

In the particular example of FIG. 3, rotor 34 has a hollow configuration with both rotor 34 and thrust tube 40 coaxially disposed about screw shaft 36. Thus, the rotational axis and longitudinal axis for reciprocal motion of thrust tube 40 coincide. Alternatively, an offset drive system can be provided with parallel rotational and longitudinal axes, or in a transversely mounted motor with perpendicular rotational and longitudinal axes.

Nut assembly 42 is configured to convert rotational motion of rotor 34 and screw shaft 36 about axis A into linear motion of thrust tube 40 along axis A, and a bushing or bearing component 44 can be provided to support thrust tube 40 in sliding engagement with end cap 14. Motion of thrust tube 40 along axis A positions fixture 28 on distal (external) rod end 40B, generating reciprocal linear motion outside front end 14 of the housing. Bumpers or similar elastic members 43 can be provided for biasing engagement against front end 14 of the housing when thrust tube 40 is fully extended, reducing stress on motor drive 30.

Rotor 34 may be configured with a relatively short axial length, as compared to the central body portion of housing 16, so that thrust tube 40 can be positioned entirely outside rotor 34 when in the fully extended position. Thus, one or both of nut assembly 42 and proximal end 40A of thrust tube 40 can be positioned axially out beyond distal end 34B of rotor 34, e.g., with bumper 43 proximate the inner surface defined on front end 14 of the housing.

In addition, the distal or free end 34B of rotor 34 can be simply supported about axis A solely by a single bearing 38 at proximal end 34A, absent radial contact between rotor 34 and stator 32, thrust tube 40, nut assembly 42 or screw shaft 36 for the entire length of rotor 34 between free end 34B and the single bearing 38 at proximal end 34A. This configuration may reduce weight, size and complexity with respect to other designs, where the rotor component has greater axial length, and additional needle bearings or similar bearing components are utilized. In these designs, additional bearings 38 or similar rotational load components can be provided at distal end 34B of rotor 34, or anywhere along rotor 34 between proximal end 34A and distal end 34B, as described above.

Cooling Module Configuration

Cooling assembly or module 20 is coupled to a selected side of actuator system 10, and configured to dissipate heat generated by operation of actuator system 10 via thermal contact with the corresponding outer surface 16B of housing 16. As shown in FIG. 3, for example, cooling assembly 20 includes a thermal mass or block 46 with an inner surface 46S in direct physical contact with or proximate outer surface 16B on the bottom of the main or central housing structure 16.

An internal fluid channel or conduit 26 provides cooling fluid flow between inner surface 46S and outer (external) surface 46T of block 46. Heat energy generated by motor 30 and the other active components of actuator 10 is conducted or transferred from outer surface 16B of housing 16 to the block 46 for dissipation to the air or outside environment, or other thermal reservoir. Cooling fluid flow may also be provided in inside conduit 26, with the heat dissipated by transfer with the flow of the cooling fluid through outlet 26B to an external reservoir, heat exchanger, or similar device.

Alternatively, cooling assembly 20 may be provided in the form of a heat sink apparatus, which is configured to dissipate heat from linear actuator 10 with or without the need for external cooling fluid flow through conduit 26. In heat sink embodiments, fins or similar passive radiating or convective cooling structures may be provided on assembly 20; e.g., on bottom external surface 46T of thermal mass or block 46, or on other outer surfaces of thermal block 46 or cooling assembly 20 in thermal contact with the surrounding air or other medium. Depending on application, internal cooling fluid flow may also be provided to improve heat transport from the inner surfaces of assembly 20 adjacent linear actuator 10 to the outer radiating and convective surfaces exposed to the surrounding medium. The flow may be internal or external, with or without fluid inlet and outlet connections 26A and 26B.

Cooling assembly 20 is adapted to conform to the outer surface 16B of actuator housing 16. In the particular example of FIG. 3, the main portion of housing 16 is formed of a cylindrical or tubular body member disposed coaxially about electric motor 30 and screw shaft 36, extending along axis A between end caps or plates forming the housing structures 12 and 14 on opposing ends of the central body 16.

Cooling assembly 20 includes a thermal mass or block 46 with one or more internal flow passages, ducts or conduits 26. Flow conduits 26 are configured for conducting cooling fluid through thermal block 46, extending longitudinally though block 46 along actuator housing 16, with interior surface 46S of block 46 in thermal contact with outer surface 16B of housing 16.

Interior surface 46S of thermal block conforms to outer housing surface 16B, for example with a concave arcuate geometry complementary to the outer (convex) cylindrical geometry of housing 16. In one example, connectors 18 are disposed about the periphery of actuator housing 16 as shown in FIG. 4 (below), extending longitudinally along outer surface 16B of housing 16 to couple front and back ends 12 and 14 of the housing together using nuts or similar mechanical fasteners 19.

Mechanical couplings 24 (see FIGS. 1, 2) couple thermal block 46 of cooling module 20 between an adjacent pair of longitudinal connectors 18. Cooling assembly 20 can be configured for selectively coupling to actuator housing 16 between any adjacent pair or set of connectors 18, and disposed in thermal contact with the correspond outer housing surface 16B. Suitable positions include the bottom of actuator 10 as shown, or along the top or sides, each extending longitudinally along a different side or section of housing 16.

Independent Modular Cooling

Figure 4:
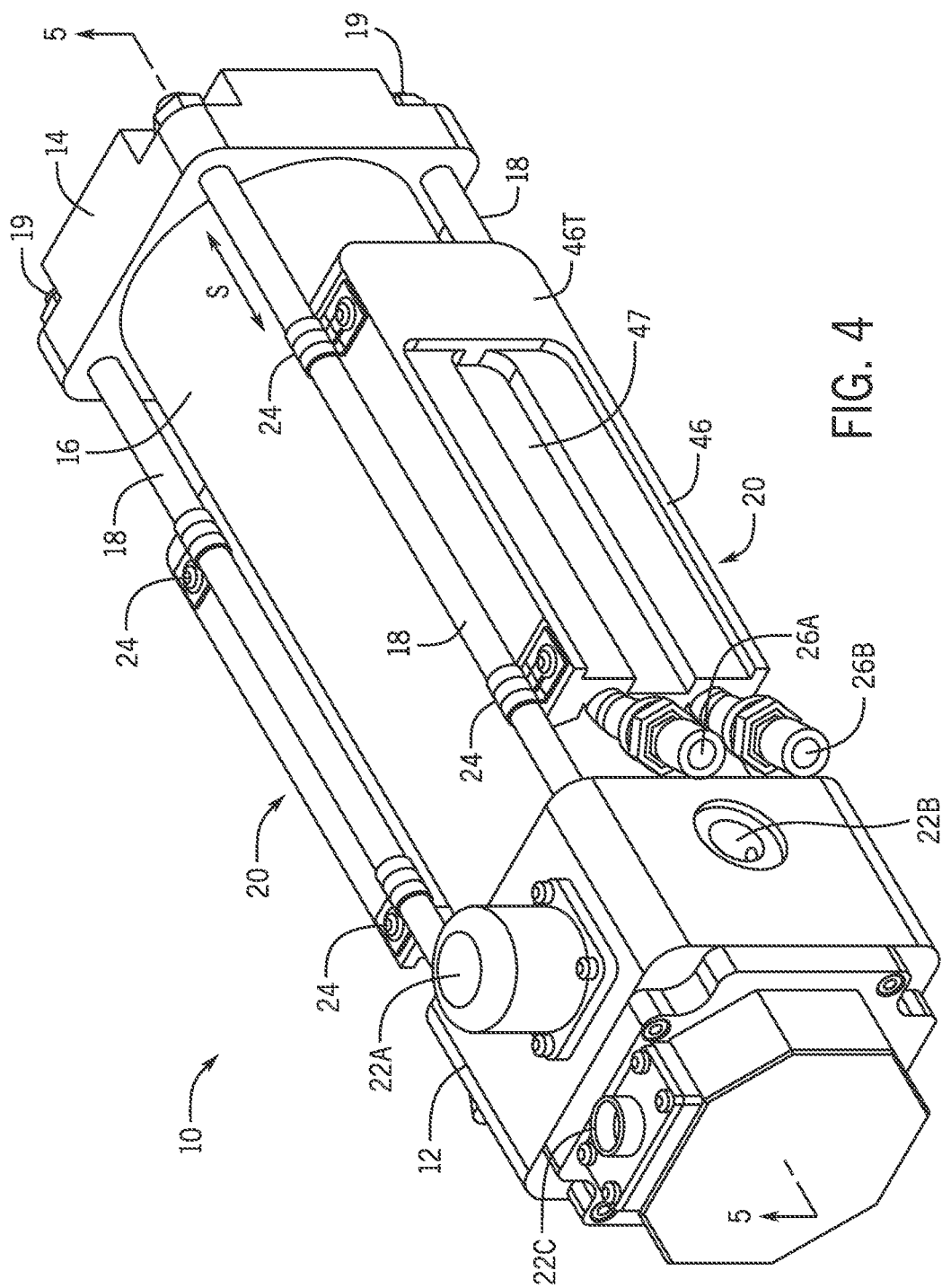
FIG. 4 is an isometric view of an integrated motor linear actuator system with independent cooling modules.

FIG. 4 is an isometric view of a lightweight, integrated motor linear actuator system 10 with independent modular cooling assemblies 20 coupled to opposite sides of actuator housing 16. As shown in FIG. 4, thermal blocks 46 are disposed in direct thermal and physical contact with outer (external) housing surface 16B, on opposite sides of actuator 10.

One or more cooling assemblies 20 are positionable on one, two or more sides of actuator housing 16, each with independently regulated cooling fluid flow through individual inlets and outlets 26A and 26B, or with any combination of internal cooling flow, external cooling flow, cooling fins and other radiative or convective features, in active or passive form. The system mass can be further reduced by forming recesses 47 on each block 46, for example by milling, machining or "hogging out" material between the internal fluid channels connected to inlet 26A and outlet 26B.

Mechanical couplings 24 can be configured in the form of screw blocks or clips for attachment of cooling assembly 20 to actuator housing 16, for example by coupling the longitudinal sides of thermal block 46 between adjacent longitudinal connectors or rods 18, as shown in FIG. 4. Mechanical couplings 24 can also be adapted to position cooling assembly 20 along different longitudinal regions of each exterior side, for example by sliding assembly 20 to a desired position between back housing component 12 and front housing component 14, as illustrated by arrow S.

Figure 5:
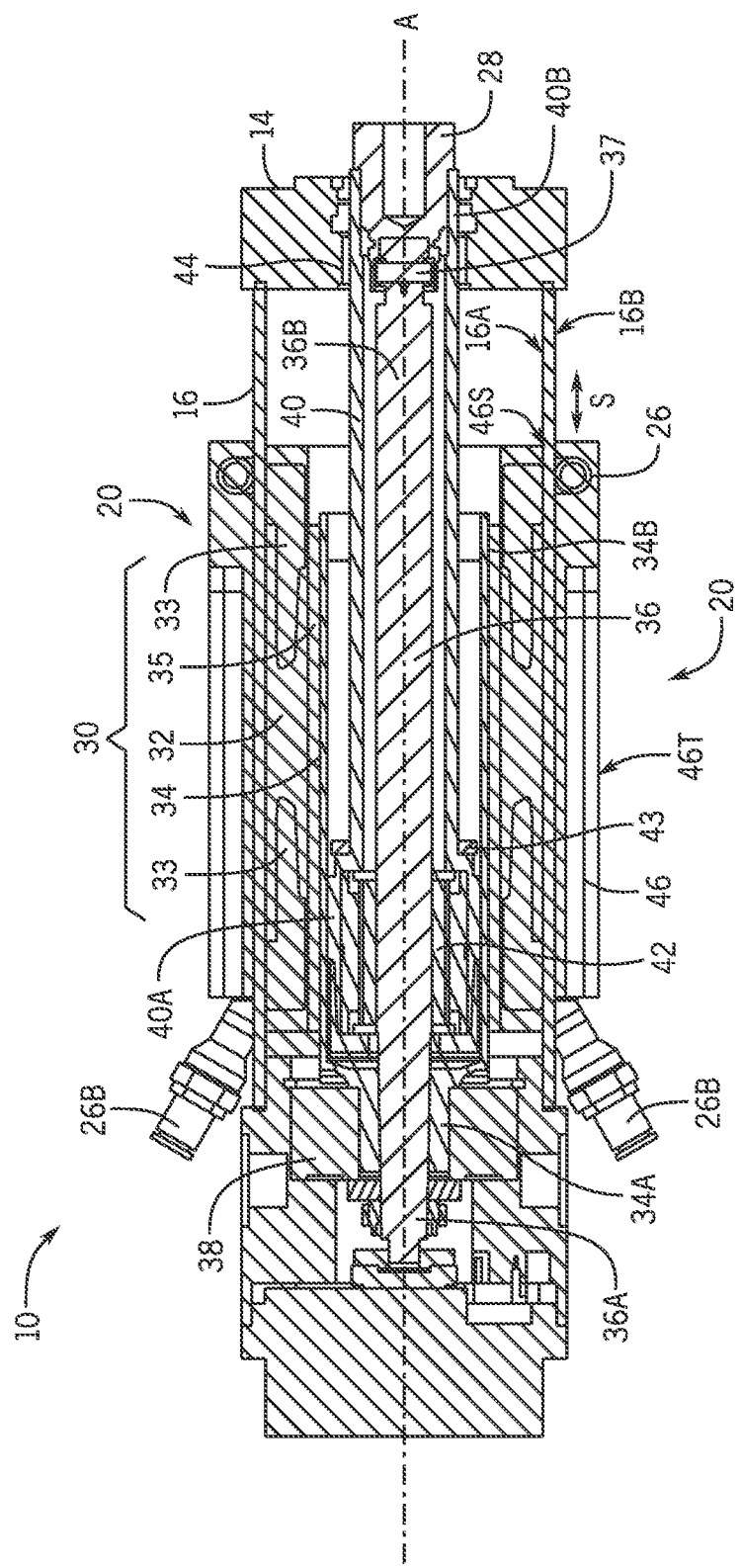
FIG. 5 is a longitudinal section view of the linear actuator system in FIG. 4.

FIG. 5 is a longitudinal section view of linear actuator system 10, taken along line F5-F5 in FIG. 4. As shown in FIG. 5, independent cooling assemblies or modules 20 can be provided on opposite sides of actuator housing 16, in thermal contact with the corresponding side surfaces 16B, or across top and bottom surfaces 16B, or any combination thereof.

Cooling assemblies 20 can also be positioned longitudinally along outer surface 16B of housing 16, in the axial direction as described by arrow S. This improves heat dissipation by providing cooling fluid flow through conduits 26 proximate the heat-producing components of actuator system 10, including example coils or stator windings 33 of electric motor 30 as shown in FIG. 5, or other internal actuator components.

FIG. 6 is an isometric view of a representative flow configuration for cooling assembly 20, suitable for use with a linear actuator system as described herein. In this view the thermal block is removed, illustrating the configuration of cooling flow channel of conduit 26 from fluid inlet 26A to fluid outlet 26B, proximate outer surface 16B of actuator housing 16.

As shown in FIG. 6, fluid flow is generally longitudinal along actuator housing 16, through the major parallel sections of flow conduit 26 coupled to inlet 26A and outlet 26B, respectively. These sections of conduit 26 come together at a short transverse or circumferentially extending section 26S, opposite inlet 26A and outlet 26B.

Conduits 26 are positioned in thermal communication with the selected outer surface 16B of actuator housing 16 by coupling the thermal block to longitudinal rods 18 using screw blocks, clips, or similar mechanical fasteners 24, as described above. Alternatively, conduits 26 can be positioned in direct thermal contact with the selected (outer) surface of housing 16 with or without a thermal block component, e.g., by coupling conduits 26 directly to housing 16, or by attaching conduits 26 in biased engagement with outer surface 16B of housing 16 using mechanical couplings 24.

Figure 7A:
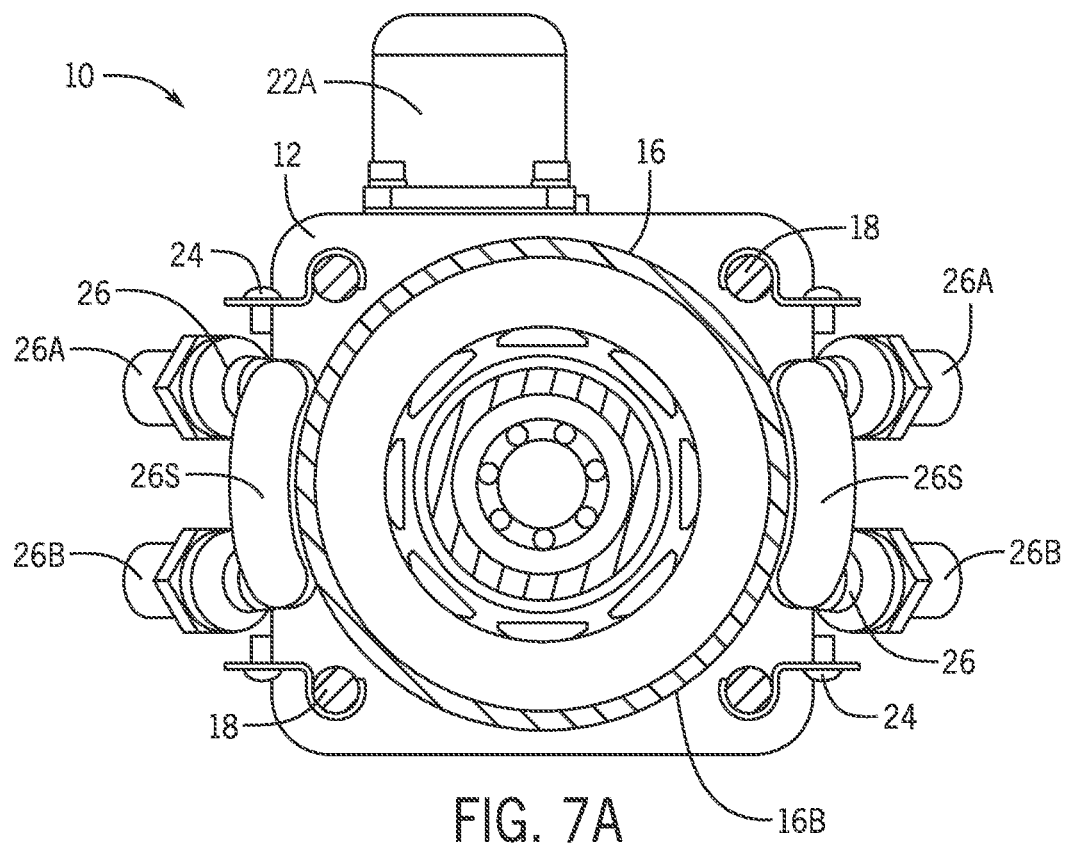
FIG. 7A is an end section view of the linear actuator system in FIG. 6, showing the cooling flow configuration.

FIG. 7A is an end section view of linear actuator system 10, taken along line F7-F7 in FIG. 6 (that is, looking back along actuator housing 16 toward back end 12). As shown in FIG. 7A, end sections 26S of cooling conduit 26 are provided with a concave arcuate profile, complementing the corresponding convex curvature of housing 16 to improve thermal contact with outer surface 16B.

Figure 7B:
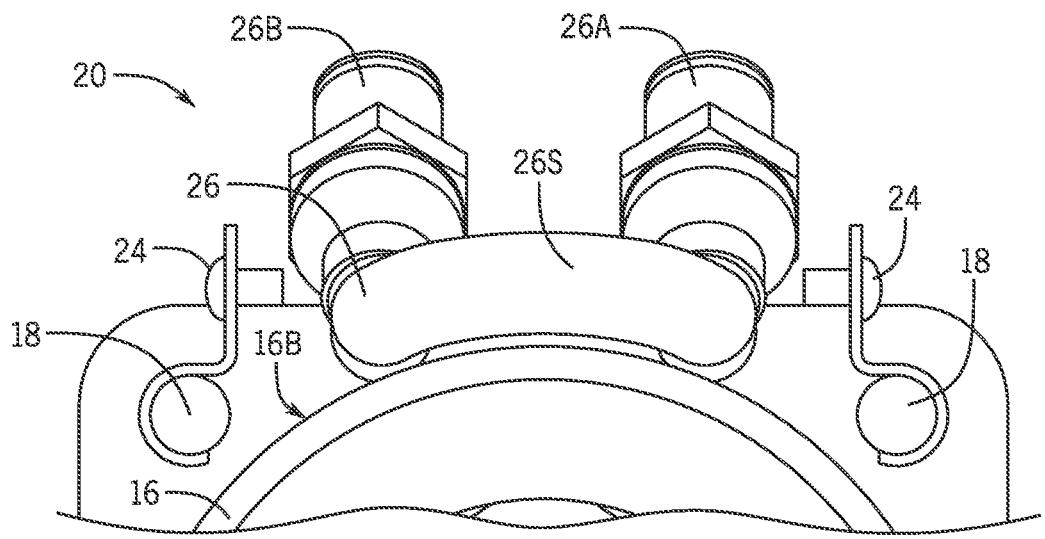
FIG. 7B is a detail view of the end section in FIG. 7A, rotated 90° to show the thermal coupling between the cooling module and actuator housing.

FIG. 7B is a detail view of the end section in FIG. 7A, rotated 90° to show the thermal coupling between cooling flow channels or conduits 26 and actuator housing 16. As shown in 7B, end conduit section 26S maintains substantially direct thermal and physical contact with outer surface 16B of actuator housing 16, improving thermal conduction and heat dissipation.

Figure 8:
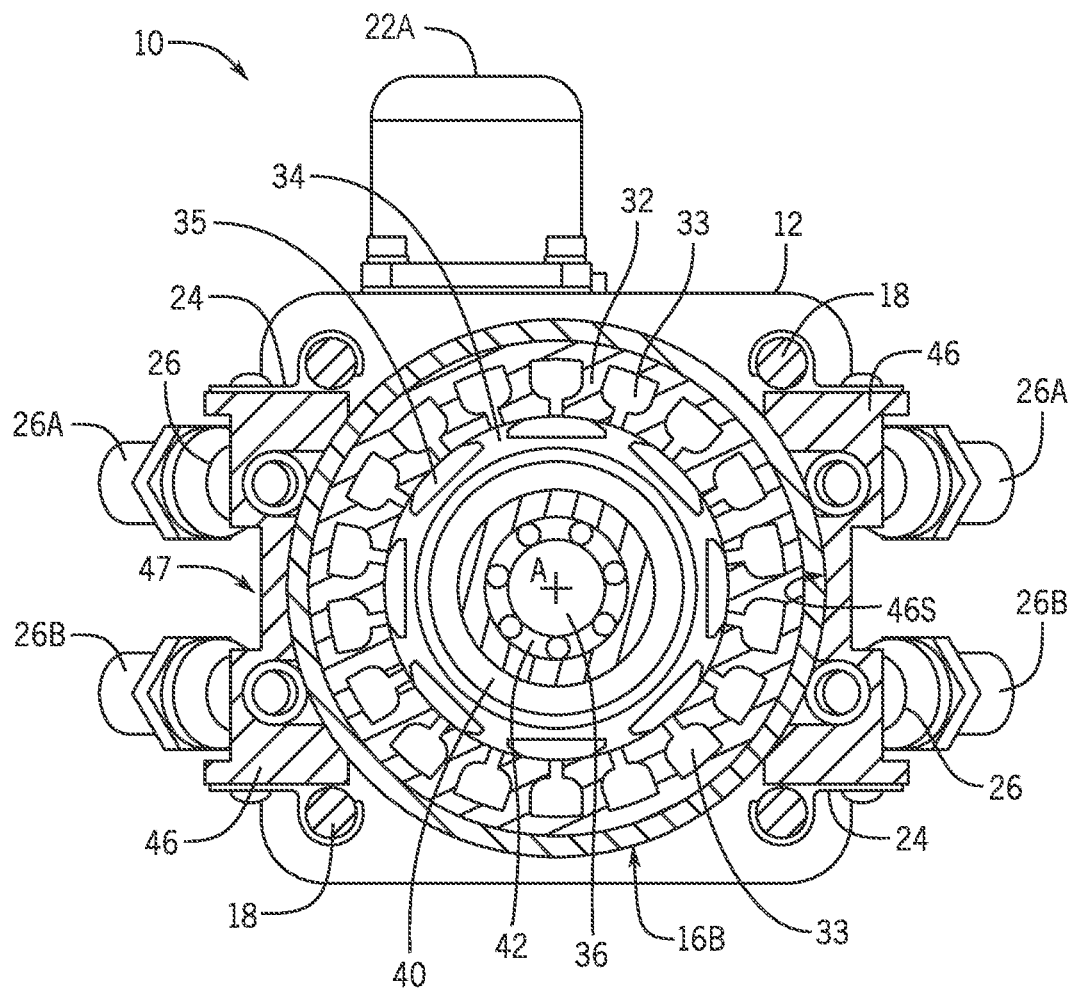
FIG. 8 is a mid-section view of the cooling module and linear actuator system in FIG. 6.

FIG. 8 is a mid-section view of linear actuator system 10, taken along line F8-F8 in FIG. 6. In this view, system 10 includes two independent cooling modules 20, with cooling fluid flow through conduits 26 disposed inside thermal blocks 46 positioned on each side of actuator housing 16.

Stator 32 is disposed inside actuator housing 16, for example attached to the interior surface with stator windings 33 configured to generate a time-varying magnetic field, as described above. The field interacts with magnets 35, driving rotor 34 into rotation about axis A.

In this example screw shaft 36 is rotationally coupled to rotor 34, and coaxially disposed about rotational axis A. A ball or roller nut assembly 42 engages the externally threaded portion of screw shaft 36, converting rotational motion of rotor 34 and screw shaft 36 into linear motion of thrust tube 40, in a longitudinal direction along axis A. The rotational speed and direction of rotor 34 is controlled to generate reciprocal motion of thrust tube 40, extending and retracting the rod end or fixture component outside the front of the actuator housing, as described above.

The inner surface 46S of each thermal block 46 is provided with a concave arcuate geometry, complementary to convex outer surface 16B of the main housing body 16. Weight is reduced by removing block material from recessed portions 47, e.g., between the parallel sections of fluid conduits 26, running longitudinally along the body of housing 16.

FIG. 8 also shows the biasing engagement between clip-type mechanical couplings 24 and longitudinal rod connectors 18. These features cooperate to improve the thermal coupling between cooling assembly 20 and actuator housing 16, by engaging inner surface 46S of thermal block 46 in direct thermal and physical contact with outer housing surface 16B.

Clip-type mechanical couplings 24 can be configured for simple, tool-less engagement and disengagement of cooling assembly 20 from the selected side of actuator housing 16. Alternatively, screw blocks or similar mechanical fasteners 24 can be used. The mechanical coupling can also be adapted for sliding engagement between cooling assembly 20 and actuator housing body 16, e.g., as described above, in order to position cooling assembly 20 in thermal contact with a selected longitudinal section along the side of actuator housing 16.

Examples

Suitable linear actuator systems may be provided according to the above disclosure, e.g., comprising a housing having a screw shaft extending along a longitudinal axis therein, a motor having a stator coupled to an interior surface of the housing and a rotor disposed coaxially about the screw shaft, along the longitudinal axis. A thrust tube can be engaged with the screw shaft, e.g., where rotation of the rotor is converted into linear motion of the thrust tube along the longitudinal axis. A modular cooling assembly can be selectively coupled to an exterior surface of the actuator housing and in thermal contact therewith, e.g., with the modular cooling assembly configured to dissipate heat generated by operation of the motor.

The rotor can be rotationally supported about the longitudinal axis by a bearing at one end, e.g., with the rotor extending coaxially about the screw shaft from the bearing at the one end to a free end opposite the bearing. The free end of the rotor can be supported by a single bearing at the one end, e.g., absent additional bearings at the free end or between the free end and the single bearing at the one end. The free end of the rotor c may be supported solely by the single bearing at the one end, absent contact or radial support between the rotor and the stator or between the rotor and the thrust tube or screw shaft, and absent such contact or radial support along an axial extent of the rotor from the free end to the single bearing at the one end.

The actuator housing can comprise a central portion disposed between two end caps or end plates, e.g., at opposite ends of the central portion along the longitudinal axis. The central portion of the housing may comprise a cylindrical or tubular member disposed coaxially about the electric motor and screw shaft, e.g., with the cylindrical or tubular member extending along the longitudinal axis between the end caps or end plates.

The modular cooling assembly can comprise a flow passage or duct configured for fluid flow, e.g., with the flow passage or duct extending along the central portion of the actuator housing proximate the exterior surface thereof. The modular cooling assembly may comprise a thermal mass or block through which the flow passage or duct extends, e.g., with the thermal mass or block having an interior surface configured to conform to the exterior surface of the actuator housing and with the thermal mass or block extending along the central portion thereof.

A plurality of longitudinal connectors can couple the end caps or plates together about the central portion of the housing, e.g., with the connectors disposed about a periphery of the central portion and extending longitudinally therealong. The modular cooling assembly may be configured to selectively couple to the actuator housing in thermal contact with the outer surface between any adjacent pair or set of the longitudinal connectors. A plurality of mechanical coupling members can be configured to couple the modular cooling assembly to any such adjacent pair or set of the longitudinal connectors, in thermal contact with the exterior of the housing.

In any of the above examples and embodiments, the modular cooling assembly can be configured for selectively coupling to the exterior surface of the actuator housing, in thermal contact with any of a plurality of different sides thereof. The modular cooling assembly can be further configured for selectively coupling to different longitudinal regions defined along each or any of the different sides. First and second modular cooling assemblies can also be selectively coupled to different sides or longitudinal regions of the actuator housing, e.g., with the first and second modular cooling assemblies disposed on opposite sides of the actuator housing and configured for water cooling to dissipate heat from each opposite side during operation of the actuator system.

A suitable linear actuator system may comprise one or more of a housing having a screw shaft extending along a longitudinal axis, a motor having a stator coupled to the housing and a rotor disposed about the screw shaft, e.g., extending along the longitudinal axis, and a nut assembly engaged with the screw shaft. A thrust tube member can engage with the nut assembly, e.g., where rotation of the rotor is converted into linear motion of the thrust tube member along the longitudinal axis. A modular cooling assembly selectively couplable to the actuator housing can be disposed in thermal contact with an outer surface thereof, e.g., with the modular cooling assembly configured to dissipate heat generated by operation of the linear actuator.

A bearing assembly can be configured to rotationally support the rotor about the longitudinal axis, e.g., with the rotor extending coaxially about the screw shaft from the bearing assembly at one end to a free end opposite the bearing assembly. The free end of the rotor can be supported about the longitudinal axis by the bearing assembly at the one end, absent additional radial support between the free end and the bearing assembly.

The modular cooling assembly can comprise a thermal block having an inner surface adapted to conform to the outer surface of the actuator housing, e.g., with the outer surface defined along a central portion of the actuator housing extending between opposing ends thereof. The central portion of the housing can comprise a tubular structure disposed about the motor and screw shaft, the inner surface of the modular cooling assembly adapted to conform to the outer surface of the tubular structure and extending at least partially between the opposing ends of the actuator housing.

A plurality of longitudinal connecting members can be disposed about a periphery of the central portion of the actuator housing, e.g., extending longitudinally between the opposing ends. The modular cooling assembly can be selectively coupled to the actuator housing in thermal contact with the outer surface defined between a set of such adjacent longitudinal connecting members. A plurality of fasteners can be configured to selectively couple and decouple the modular cooling assembly with the adjacent longitudinal connecting members.

A fluid passage can be defined within the modular cooling assembly, and configured for cooling fluid flow adjacent the outer surface of the actuator housing with the modular cooling assembly coupled thereto. An inlet and outlet can be configured for external cooling fluid flow through the fluid passage, e.g., to transfer the heat to an external reservoir or medium, with the modular cooling assembly selectively coupled to the outer surface of the actuator housing.

A thermal block can define the inner surface of the modular cooling assembly. A plurality of convective or radiating structures can be disposed along an outer surface of the thermal block, e.g., with the convective or radiating structures configured to dissipate the heat from the thermal block to an external medium such as the air or other gas in the surrounding environment, or to another other external medium.

The modular cooling assembly can have an inner surface configured for thermal contact with the outer surface of the actuator housing along a plurality of different sides or different longitudinal sections thereof. At least two of such modular cooling assemblies can be selectively coupled to different sides or longitudinal sections of the actuator housing, e.g., with each modular cooling assembly in sliding engagement with the side of the housing body and positioned in a selected longitudinal section to dissipate a respective portion of the heat.

Suitable methods may include operating a motor of a linear actuator system having a housing and a screw shaft extending along a longitudinal axis, e.g., with the motor having a stator coupled to the housing and a rotor disposed about the screw shaft, extending along the longitudinal axis. The methods may also include positioning a thrust tube member with respect to the housing, e.g., with the thrust tube member engaging the screw shaft via a nut assembly configured to convert rotational motion of the motor to linear motion of the thrust tube along the longitudinal axis, and dissipating heat generated by the linear actuator, e.g., with a modular cooling assembly selectively couplable and decoupleable with the actuator housing.

The modular cooling assembly can be disposed in thermal contact with an outer surface of the actuator housing to transfer the heat therefrom. A free end of the rotor can be supported about the longitudinal axis via a bearing assembly disposed at an opposing end of the rotor, e.g., absent other radial support between the bearing assembly and the free end.

The modular cooling assembly can be selectively coupled to a side of the actuator housing, e.g., with an inner surface of the modular cooling assembly disposed in thermal contact with the outer surface of the actuator housing. For example, the modular cooling assembly can be attached between adjacent longitudinal connectors disposed about a central portion of the actuator housing, with the central portion of the actuator housing extending about the motor and screw shaft along the longitudinal axis. The longitudinal connectors can extend along the central portion, e.g., between opposing ends of the actuator housing, and the modular cooling assembly can be fastened to the actuator housing between adjacent longitudinal connectors.

Fluid can be circulated through the modular cooling assembly, e.g., to transfer the heat generated by the linear actuator to an external medium or thermal reservoir such as the air, or to an external heat sink, heat exchanger, or other heat transfer apparatus. The heat can also be transferred to such an external medium via a plurality of heat sink structures defined on an outer surface of the modular cooling assembly, e.g., with the heat sink structures configured for one or both of convective and radiative cooling.

The modular cooling assembly can be coupled to a selected side or longitudinal section of the actuator housing, e.g., where two or more different sides or longitudinal sections of the actuator housing are configured for selectively coupling to the modular cooling assembly. Depending on embodiment, the different sides or longitudinal sections may have different heating loads during operation of the linear actuator, e.g., depending on proximity to the motor and screw components, of the heating loads may be similar or substantially the same, e.g. on opposite sides of the motor.

Respective portions of the heat generated by the linear actuator can be dissipated from two or more of such modular cooling assemblies, e.g., selectively coupled to different sides or longitudinal sections of the actuator housing. In these examples, the cooling fluid flow can be independently regulated for each module, depending on the thermal loading to which the respective section of the actuator housing is subject during operation. Alternatively, a thermal block can be provided with fins or other external convective or radiative cooling features adapted to the thermal load, or a combination of cooling fluid flow and external cooling structures or similar features can be provided.

Suitable modularly cooled linear actuator systems can comprise one or more of a housing having a screw shaft extending along a longitudinal axis, a motor having a stator coupled to the housing and a rotor disposed about the screw shaft. a nut assembly engaged with the screw shaft, and a thrust tube member engaged with the nut assembly, e.g., where rotation of the rotor is converted into linear motion of the thrust tube member along the longitudinal axis. A modular cooling assembly can be provided with a thermal block defining an inner surface in thermal contact with an outer surface of the actuator housing, e.g., to dissipate heat generated by operation of the linear actuator.

The modular cooling assembly can be selectively couplable to and decouplable from the actuator housing, e.g., along one or more suitably adapted sides or longitudinal sections. The modular cooling assembly may include a thermal block defining an inner surface configured to conform with the outer surface of the actuator housing, e.g., along a central portion extending along the longitudinal axis about the motor and screw shaft, between opposite ends of the actuator housing. A fluid passage can be configured for cooling fluid flow through the thermal block, e.g., where the cooling fluid transfers the heat to an external medium such as the surrounding air or other surrounding environment, or an external heat sink, heat exchanger, or thermal reservoir.

Suitable linear actuator system may also include one or more of a housing having a longitudinal axis, a screw shaft extending along the longitudinal axis of the housing, and a motor having a stator coupled to the housing and a rotor disposed about the screw shaft. The rotor can extend from a first end to a free end opposite the first end, and a thrust tube can engage with the screw shaft, e.g., where rotation of the rotor is converted into linear motion of the thrust tube along the longitudinal axis.

A single bearing assembly may be provided at the first end of the rotor, the single bearing assembly configured to rotationally the free end of the rotor about the longitudinal axis. The free end of the rotor can be supported absent additional bearing components, either at the free end or between the free end and the single bearing assembly at the first end, opposite the free end.

A length of the rotor can be configured for the thrust tube to have an extended position disposed entirely outside the rotor, e.g., axially beyond the free end. An elastic member can be configured for biased engagement against a front end of the housing, with the thrust tube in the extended position.

A nut assembly can engage the thrust tube with the screw shaft, with the nut assembly configured to convert the rotation of the rotor to the linear motion of the thrust tube. A length of the rotor can be configured for the thrust tube to have an extended position with the nut assembly disposed axially beyond the free end of the rotor, e.g., entirely outside the rotor in the longitudinal direction.

A modular cooling assembly can be selectively coupled to a surface of the actuator housing, and disposed in thermal contact therewith. The modular cooling assembly can be configured to dissipate heat generated by operation of the linear actuator system, e.g., from the surface of the actuator housing, according to any of the examples and embodiments herein.

While this invention has been described with reference to exemplary embodiments, it will be understood by those skilled in the art that various changes can be made and equivalents may be substituted without departing from the spirit and scope thereof. Modifications can also be made to adapt the teachings of the invention to particular problems, technologies, materials, applications and materials, without departing from the essential scope thereof. Thus, the invention is not limited to the particular examples that are disclosed here, but instead encompasses all embodiments falling within the scope of the appended claims.

The invention claimed is:

1. A linear actuator system comprising:
   an actuator housing disposed about a longitudinal axis with an inner, internal surface at an interior of the actuator housing and an outer, external surface at an exterior of the actuator housing;
   a screw shaft extending along the longitudinal axis inside of the actuator housing;
   a motor having a stator coupled to the inner, internal surface of the actuator housing and a rotor disposed about the screw shaft;
   a nut assembly engaged with the screw shaft;
   a thrust tube engaged with the nut assembly, wherein rotation of the rotor is converted into linear motion of the thrust tube along the longitudinal axis;
   at least one modular cooling assembly selectively couplable to and decoupleable with the exterior of the actuator housing; and
   one or more mechanical connectors configured for coupling the modular cooling assembly in mounted engagement to a selected side or longitudinal section of the actuator housing, with an inner surface of the modular cooling assembly disposed in contact with the outer, external surface of the actuator housing,
   wherein two or more different sides or longitudinal sections of the actuator housing are configured for selectively coupling with the modular cooling assembly to dissipate heat generated by operation of the motor and linear actuator system, the modular cooling assembly being independently and separately mountable in thermal contact with any of the different sides or longitudinal sections such that at least one side or at least one longitudinal section of the actuator housing remains uncoupled from the modular cooling assembly.

2. The linear actuator system of claim 1, further comprising a thermal block at the inner surface of the modular cooling assembly and adapted to conform to the outer, external surface of the actuator housing, the outer, external surface defined along a central portion of the actuator housing, extending between opposing ends of the actuator housing.

3. The linear actuator system of claim 1, further comprising a thermal block defining the inner surface of the modular cooling assembly, in contact with the outer, external surface of the actuator housing, and one or more cooling structures configured to dissipate the heat from the thermal block by at least one of radiative and convective cooling.

4. The linear actuator system of claim 1, wherein the central portion of the actuator housing comprises a tubular structure disposed about the rotor and screw shaft, the inner surface of the modular cooling assembly adapted to conform to the tubular structure extending at least partially between the opposing ends of the actuator housing.

5. The linear actuator system of claim 4, further comprising a set of longitudinal connectors disposed about a periphery of the central portion of the actuator housing and extending between the opposing ends, wherein the modular cooling assembly is selectively coupled to the actuator housing between adjacent members of the set of longitudinal connectors.

6. The linear actuator system of claim 5, wherein the one or more mechanical couplings comprise one or more fasteners configured to selectively couple the modular cooling assembly to the adjacent longitudinal connectors in biased engagement with the outer, external surface of the actuator housing.

7. The linear actuator system of claim 5, wherein the one or more mechanical couplings are configured to attach the modular cooling assembly to the adjacent connectors in sliding engagement with the outer, external surface of the actuator housing, wherein the modular cooling assembly is positionable in contact with each of the two or more different longitudinal sections of the actuator housing.

8. The linear actuator system of claim 1, further comprising a fluid passage defined within the modular cooling assembly and configured for directing cooling fluid flow adjacent the outer, external surface of the actuator housing with the modular cooling assembly coupled thereto.

9. The linear actuator system of claim 8, further comprising an inlet and outlet configured for external cooling fluid flow through the fluid passage.

10. The linear actuator system of claim 1, wherein the one or more mechanical connectors are configured for selectively coupling the modular cooling assembly in engagement with the outer, external surface of the actuator housing along a selected one of the two or more different sides.

11. The linear actuator system of claim 10, comprising at least two of said modular cooling assemblies selectively coupled to the two or more different sides or longitudinal sections of the actuator housing, each modular cooling assembly configured to dissipate a respective portion of the heat.

12. The linear actuator system of claim 1, wherein the rotor is rotationally supported about the longitudinal axis by a bearing at one end, the rotor extending coaxially about the screw shaft from the bearing at the one end to a free end opposite the bearing.

13. The linear actuator of claim 12, wherein the free end of the rotor is radially supported by the bearing at the one end, absent additional bearing components at the free end or between the free end and the bearing at the one end.

14. The linear actuator of claim 12, further comprising at least one additional bearing component disposed at the free end of the rotor or between the free end and the bearing component at the one end.

15. A method comprising:
    operating a motor of a linear actuator system comprising an actuator housing disposed about a longitudinal axis with an inner, internal surface at an interior of the actuator housing and an outer, external surface at an exterior of the actuator housing, and a screw shaft extending along the longitudinal axis inside of the actuator housing, the motor having a stator coupled to the inner, internal surface of the actuator housing, a rotor disposed about the screw shaft, a nut assembly engaged with the screw shaft, and a thrust tube engaged with the nut assembly;
    positioning the thrust tube with respect to the actuator housing, the thrust tube engaging the screw shaft with the nut assembly configured to convert rotational motion of the motor to linear motion of the thrust tube along the longitudinal axis, wherein rotation of the rotor is converted into the linear motion of the thrust tube; and dissipating heat generated by the motor and linear actuator system with at least one modular cooling assembly selectively couplable to and decoupleable with the exterior of the actuator housing, wherein the linear actuator system comprises one or more mechanical connectors coupling the modular cooling assembly in mounted engagement to a selected side or longitudinal section of the actuator housing with an inner surface of the modular cooling assembly disposed in contact with the outer, external surface of the actuator housing to transfer the heat therefrom, and wherein two or more different sides or longitudinal sections of the actuator housing are configured for selectively coupling with the modular cooling assembly to dissipate the heat generated by operation of the motor and linear actuator system, the modular cooling assembly being independently and separately mountable in thermal contact with any of the different sides or longitudinal sections such that at least one side or at least one longitudinal section of the actuator housing remains uncoupled from the modular cooling assembly.

16. The method of claim 15, further comprising selectively coupling the modular cooling assembly to the selected side or longitudinal section of the actuator housing with the one or more mechanical connectors, wherein the inner surface of the modular cooling assembly is disposed in contact with the outer, external surface of the actuator housing.

17. The method of claim 15, further comprising attaching the modular cooling assembly to the selected side or longitudinal section between adjacent longitudinal connectors disposed about a central portion of the actuator housing, the central portion of the actuator housing extending about the rotor and screw shaft and the longitudinal connectors extending along the central portion of the actuator housing between opposing ends thereof.

18. The method of claim 15, further comprising circulating fluid through the modular cooling assembly to transfer the heat generated by the linear actuator to an external medium.

19. The method of claim 15, wherein dissipating the heat comprises one or both of convective and radiative cooling via a plurality of external cooling structures defined on an external surface of the modular cooling assembly.

20. The method of claim 15, further comprising coupling the modular cooling assembly to a selected one of the two or more different sides of the actuator housing, wherein the two or more different sides are each configured for selectively coupling to the modular cooling assembly.

21. The method of claim 15, further comprising sliding the modular cooling assembly to a selected longitudinal position along one of the two or more sides, in biased engagement with the outer, external surface of the actuator housing.

22. The method of claim 15, further comprising dissipating respective portions of the heat from two or more of said modular cooling assemblies selectively coupled to the two or more different sides or longitudinal sections of the actuator housing.

23. The method of claim 15, further comprising supporting a free end of the rotor about the longitudinal axis with a single bearing assembly disposed opposite the free end, absent additional bearing components at the free end or between the single bearing assembly and the free end.

24. The method of claim 23, further comprising positioning the thrust tube axially outside the rotor, in an extended position disposed beyond the free end.

25. A linear actuator system comprising:

an actuator housing disposed about a longitudinal axis with an inner, internal surface at an interior of the actuator housing and an outer, external surface at an exterior of the actuator housing;

a screw shaft extending along an the longitudinal axis inside of the actuator housing;

a motor having a stator coupled to the inner, internal surface of the actuator housing and a rotor disposed about the screw shaft;

a nut assembly engaged with the screw shaft;

a thrust tube engaged with the nut assembly, wherein rotation of the rotor is converted into linear motion of the thrust tube along the longitudinal axis, wherein the thrust tube comprises a thrust member;

at least one modular cooling assembly selectively couplable to and decoupleable with the exterior of the actuator housing; and one or more mechanical connectors coupling the modular cooling assembly in mounted engagement to a selected side or longitudinal section of the actuator housing with an inner surface of the modular cooling assembly disposed in contact with the outer, external surface of the actuator housing, the modular cooling assembly being independently and separately mountable in thermal contact with any of two or more different sides or longitudinal sections of the actuator housing such that at least one side or at least one longitudinal section of the actuator housing remains uncoupled from the modular cooling assembly, wherein the modular cooling assembly is configured to dissipate heat generated by operation of the motor and linear actuator system, and wherein the linear actuator system is modularly cooled.

26. The linear actuator system of claim 25, further comprising a thermal block defining the inner surface of the modular cooling assembly and configured to conform with the outer, external surface of the actuator housing along a central portion thereof, the central portion extending along the longitudinal axis about the rotor and screw shaft.

27. The linear actuator system of claim 25, further comprising a fluid passage configured for cooling fluid flow through the modular cooling assembly, wherein the cooling fluid flow transfers the heat from generated by operation of the motor and linear actuator system to an external medium or reservoir.

28. The linear actuator system of claim 25, wherein the one or more mechanical couplings are configured for biased engagement of the modular cooling assembly with the outer, external surface of the actuator housing defined between adjacent longitudinal connecting members extending between opposing ends thereof.

29. The linear actuator system of claim 25, wherein the one or more mechanical couplings are adapted to position the modular cooling assembly along an exterior side of the actuator housing in sliding engagement with the outer, external surface.

30. The linear actuator system of claim 25, further comprising a bearing assembly configured to rotationally support a free end of the rotor about the longitudinal axis, the bearing assembly disposed opposite the free end, absent additional radial support at the free end of the rotor or between the free end and the bearing assembly opposite the free end.

31. A linear actuator system comprising:

an actuator housing disposed about a longitudinal axis with an inner, internal surface at an interior of the actuator housing and an outer, external surface at an exterior of the actuator housing;

a screw shaft extending along the longitudinal axis inside of the actuator housing;

a motor having a stator coupled to the inner, internal surface of the actuator housing and a rotor disposed about the screw shaft, the rotor extending from a first end to a free end opposite the first end;

a nut assembly engaged with the screw shaft;

a thrust tube engaged with the nut assembly and the screw shaft, wherein rotation of the rotor is converted into linear motion of the thrust tube along the longitudinal axis;

at least one modular cooling assembly selectively couplable to and decoupleable with the exterior of the actuator housing; and one or more mechanical connectors coupling the modular cooling assembly in mounted engagement to a selected side or longitudinal section of the actuator housing with an inner surface of the modular cooling assembly disposed in contact with the outer, external surface of the actuator housing, wherein two or more different sides or longitudinal sections of the actuator housing are configured for selectively coupling with the modular cooling assembly to dissipate heat generated by operation of the motor and linear actuator system, the modular cooling assembly being independently and separately mountable in thermal contact with any of the different sides or longitudinal sections such that at least one side or at least one longitudinal section of the actuator housing remains uncoupled from the modular cooling assembly; and a single bearing assembly at the first end of the rotor, the single bearing assembly configured to rotationally support the free end of the rotor about the longitudinal axis, absent additional bearing components at the free end of the rotor or between the free end and the single bearing assembly at the first end.

32. The linear actuator system of claim 31, wherein a length of the rotor is configured for the thrust tube to have an extended position disposed entirely outside the rotor, axially beyond the free end.

33. The linear actuator system of claim 32, further comprising an elastic member configured for biased engagement against a front end of the actuator housing with the thrust tube in the extended position.

34. The linear actuator system of claim 31, further comprising a nut assembly engaging the thrust tube with the screw shaft, the nut assembly configured to convert the rotation of the rotor to the linear motion of the thrust tube.

35. The linear actuator system of claim 34, wherein a length of the rotor is configured for the thrust tube to have an extended position with the nut assembly disposed axially beyond the free end of the rotor.

* * * * *